United States Patent [19]
Yamanaka et al.

[11] Patent Number: 5,561,974
[45] Date of Patent: Oct. 8, 1996

[54] STEEL CORDS FOR THE REINFORCEMENT OF RUBBER ARTICLES AND METHOD OF PRODUCING THE SAME

[75] Inventors: Takaya Yamanaka, Kodaira; Eiji Kudo, Kuroiso, both of Japan

[73] Assignees: Bridgestone Corporation; Bridgestone Metalpha Corporation, both of Tokyo, Japan

[21] Appl. No.: 346,274

[22] Filed: Nov. 22, 1994

[30] Foreign Application Priority Data

Dec. 28, 1993 [JP] Japan .................................. 5-349130

[51] Int. Cl.⁶ .................................................. D02G 3/36
[52] U.S. Cl. .................................. 57/213; 57/15; 57/902
[58] Field of Search .................. 57/902, 213, 223, 57/215, 212, 15

[56] References Cited

U.S. PATENT DOCUMENTS

| | | | |
|---|---|---|---|
| 3,336,744 | 8/1967 | Peene | 57/213 |
| 3,996,733 | 12/1976 | Holmes | 57/145 |
| 4,332,131 | 1/1982 | Palsky et al. | 57/213 |
| 4,470,249 | 9/1984 | Chiappetta et al. | 57/213 |
| 4,609,024 | 9/1986 | Yatsunami et al. | 57/902 |
| 4,651,513 | 3/1987 | Dambre | 57/213 |
| 5,213,640 | 5/1993 | Ikehara | 57/902 |
| 5,311,917 | 5/1994 | Ikehara et al. | 57/902 |
| 5,327,713 | 7/1994 | Sakon | 57/213 |

FOREIGN PATENT DOCUMENTS

| | | |
|---|---|---|
| 0399795 | 11/1990 | European Pat. Off. . |
| 62-18678 | 4/1987 | Japan . |
| 64-30398 | 2/1989 | Japan . |
| 4257382 | 9/1992 | Japan . |
| 6-128883 | 5/1995 | Japan ............ 57/902 |
| 2080845 | 2/1982 | United Kingdom ............ 57/213 |

*Primary Examiner*—William Stryjewski
*Attorney, Agent, or Firm*—Sughrue, Mion, Zinn, Macpeak & Seas

[57] ABSTRACT

A steel cord for the reinforcement of rubber articles has a three-layer twisting structure comprising a core of 2 steel filaments, a middle sheath layer of 6 steel filaments and an outer sheath layer of 11 steel filaments, in which a ratio of filament diameter ds in the middle and outer sheath layers to filament diameter dc in the core (ds/dc) is within a range of 1.15–1.5 and a twisting pitch of the core is not less than 20 mm, and is used as a reinforcing member in a heavy duty pneumatic radial tire, conveyor belt and the like.

6 Claims, 3 Drawing Sheets

FIG_3
PRIOR ART
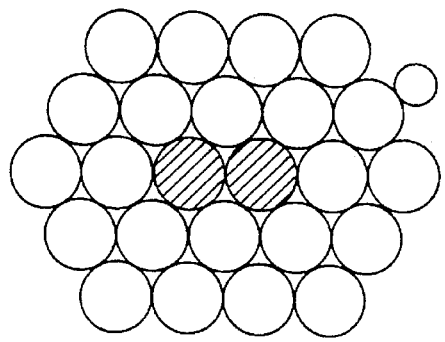
FIG_4
PRIOR ART
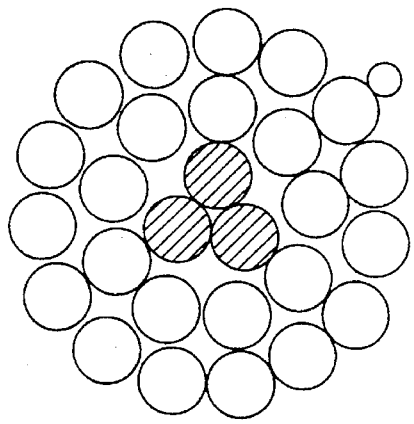
FIG_5
PRIOR ART
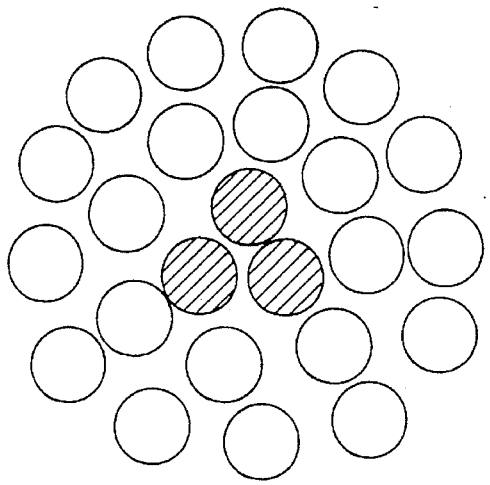

STEEL CORDS FOR THE REINFORCEMENT OF RUBBER ARTICLES AND METHOD OF PRODUCING THE SAME

BACKGROUND OF THE INVENTION

1. Field of the Invention

This invention relates to steel cords for the reinforcement of rubber articles used as a reinforcing member for heavy duty pneumatic radial tires, conveyor belt and the like. It also relates to a method of producing such steel cords.

2. Description of the Related Art

In rubber articles including pneumatic tires, steel cords are widely used as a reinforcing member. For example, steel cords having 3+9+15 twisting structure obtained by varying a twisting pitch of steel filaments having the same filament diameter every layer are widely used as the steel cord used for heavy duty tires in order to make large a cord breaking load per diameter of the cord and provide good fatigue resistance. However, the steel cord of such a structure has no space for penetrating rubber into the inside of the cord as shown in FIG. 4, so that if the cord contacts water, corrosion of the cord is caused by water penetrating into the spaces inside the cord containing no rubber.

Furthermore, there is known a steel cord of compact twisting structure in which 24 steel filaments are simultaneously twisted around 2 filaments as a core as shown in FIG. 3. Such a steel cord has also a problem in corrosion resistance because a space for penetrating rubber is not existent inside of the cord.

In order to solve such a corrosion problem, JP-B-62-18678 and JP-A-4-257382 propose steel cords capable of improving rubber penetrability into the inside of the cord by decreasing the number of steel filaments used in the sheath layer and forming a space between adjoining steel filaments in the sheath layer, respectively.

Furthermore, JP-U-64-30398 proposes that the corrosion problem can be solved and the working cost in the twisting step can be reduced by aligning the steel filaments in the core layer of the steel cord of two-layer or three-layer twisting structure in parallel with each other.

The steel cord proposed in JP-B-62-18678 has a three-layer twisting structure consisting of a core formed by twisting 2–4 steel filaments, a middle sheath layer and an outer sheath layer, in which a space between the steel filaments in each of the middle and outer sheath layers is specified to a given value. In the example of this publication, there is disclosed, for instance, a steel cord of 2+7+12×0.22 structure in which a space ratio between the filaments in the middle sheath layer is 22.6% and a space ratio between the filaments in the outer sheath layer is 21.0%. Furthermore, there are described such twisting pitch and twisting direction that the core is S lay at a twisting pitch of 5 mm, the middle sheath layer is S lay at a twisting pitch of 10 mm and the outer sheath layer is Z lay at a twisting pitch of 15 mm.

In this steel cord, however, the diameter of the steel filament constituting the core is the same as in the sheath, so that the section of the steel cord becomes too elliptical. Therefore, when such a steel cord is used in a cross belt layer of a pneumatic radial tire, there is caused a problem that a torsional deformation is apt to be created in the steel cord during running of the tire to bring about fatigue breakage.

In JP-U-64-30398 is disclosed a steel cord of two-layer or three-layer twisting structure having a core formed by aligning 2–3 steel filaments in parallel with each other. In the example of this publication, the number of the steel filaments in the core is 3 or more and a space not penetrating rubber is formed in the center of the core. When such a steel cord is used in the belt layer of the tire, it is anticipated that there is caused a problem of penetrating water from a cut portion formed in the running on bad road into the inside of the cord to corrode the cord. Further, since the diameter of the steel filament constituting the core is the same as in the sheath, the fatigue breakage is apt to be caused likewise the aforementioned case.

In JP-A-4-257382 is proposed a steel cord in which the steel filaments in the core, middle sheath layer and outer sheath layer are twisted in the same direction and the twisting pitch is the same in the core and outer sheath layer and the twisting pitch in the middle sheath layer is shorter than those of the core and outer sheath layer. In the example of this publication, there is proposed, for instance, a steel cord of 2+5+11×0.22 structure in which the twisting pitch (twisting direction) is 18 (S)/ 9 (S)/18 (S).

Such a steel cord has also a problem of fatigue breakage because the diameter of the steel filament in the core is the same as in the sheath.

In order to improve rubber penetrability, when the number of steel filaments in the sheath is reduced excessively from the compact structure, the tenacity of the cord lowers to impair the function as a reinforcing member. Also, the arrangement of the steel filaments in the sheath is disturbed to make the space between the adjoining steel filaments ununiform and hence the penetration of rubber is rather damaged.

SUMMARY OF THE INVENTION

It is, therefore, an object of the invention to provide steel cords for the reinforcement of rubber articles having a three-layer twisting structure capable of improving corrosion resistance and productivity while maintaining the advantages of the multi-layer twisting steel cord or a large cord tenacity and good fatigue resistance and a method of producing the same.

In order to solve the above problems, a first aspect of the invention lies in a steel cord for the reinforcement of rubber articles having a three-layer twisting structure and comprising a core of 2 steel filaments, a middle sheath layer of 6 steel filaments wound around the core and an outer sheath layer of 11 steel filaments wound around the middle sheath layer, characterized in that a ratio of diameter ds of a steel filament constituting the middle and outer sheath layers to diameter dc of a steel filament constituting the core (ds/dc) is within a range of 1.15–1.5 and a twisting pitch of the core is not less than 20 mm.

The preferred embodiments of the invention are as follows:

The twisting pitch of the core is infinity and the steel filaments in the core are aligned in parallel with each other.

The twisting pitch of the core is within a range of 20–50 mm.

The diameter of the steel filament in the sheath layers is within a range of 0.20–0.30 mm.

The steel filament used in the core and sheath layers is obtained by drawing a steel wire having a carbon content of 0.80–0.85% by weight and has a tensile strength of not less than 3140 MPa.

A wrapping wire is wound around the outer sheath layer.

A second aspect of the invention is a method of producing the steel cords for the reinforcement of rubber articles as mentioned above. The method comprises using 2 steel filaments as a core, winding 6 steel filaments as a middle sheath around the core, rendering a helical formed shape of the 6 steel filaments as the middle sheath into a flat shape along the outer periphery of the core of two steel filaments through rolls, and then winding 11 steel filaments as an outer sheath around the middle sheath.

In a preferred embodiment of the invention, the above steel cords for the reinforcement of rubber articles are used in a cross belt layer of a pneumatic radial tire.

BRIEF DESCRIPTION OF THE DRAWINGS

The invention will be described with reference to the accompanying drawings, wherein:

FIG. 3 is a schematically sectional view of the conventional steel cord for the reinforcement of rubber articles having a 2+8+14+1 compact twisting structure;

FIG. 4 is a schematically sectional view of the conventional steel cord for the reinforcement of rubber articles having a 1×3+9+15+1 twisting structure;

FIG. 5 is a schematically sectional view of the conventional steel cord for the reinforcement of rubber articles having a 1×3+8+13 twisting structure;

DESCRIPTION OF THE PREFERRED EMBODIMENTS

Figure 1:
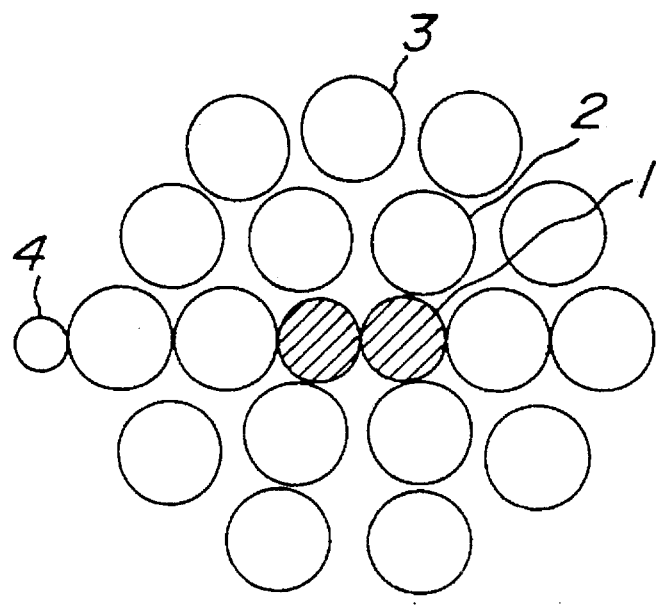
FIG 1 is a schematically sectional view of a first embodiment of the steel cord for the reinforcement of rubber article according to the invention.

In the steel cord for the reinforcement of rubber articles according to the invention, the twisting structure is a three-layer twisting structure for ensuring the desired cord tenacity and fatigue resistance. In case of the two-layer twisting structure, it is necessary to increase the diameter of the steel filament for holding the given cord tenacity and hence the fatigue resistance is degraded. On the other hand, in case of the four-layer twisting structure, the diameter of the cord becomes thick unless the diameter of the steel filament is made thin and hence the thickness of the rubberized cord layer becomes too thick and the weight of the resulting rubber article undesirably increases. Furthermore, when the diameter of the steel filament is made thin, the productivity in drawing is undesirably obstructed and also the productivity in twisting is decreased.

The reason why the number of the steel filaments used in the core is limited to 2 is due to the fact that when the cord contains only a single steel filament as the core, even if rubber penetrates into the core of the cord, the steel filaments of the sheath are eccentrically arranged to helically form a portion not covered with rubber and hence the corrosion resistance is degraded as compared with the core comprised of two steel filament, while when the core is comprised of 3 or more steel filaments, a space containing no rubber is formed in the inside of the core to degrade the corrosion resistance.

Furthermore, the reason why the number of the steel filaments constituting the middle and outer sheath layers are limited to 6 and 11, respectively, is based on the fact that it is required to hold a space between adjoining steel filaments enough to uniformly penetrate rubber into the inside of the cord.

The reason why the ratio of diameter of the steel filament in the sheath to diameter of the steel filament in the core (ds/dc) is limited to a range of 1.15–1.5 is due to the fact that when the diameter ratio is less than 1.15, the degree of elliptical shape at the section of the cord becomes extreme to easily cause the fatigue breakage and cause the deviation of the steel filaments in the sheath. Hence, a wide portion and a narrow portion in the space between the adjoining steel filaments are caused to make the uniform penetration of rubber into the inside of the cord impossible. When it exceeds 1.5, the space between the adjoining steel filaments becomes narrow and it is difficult to penetrate rubber into the inside of the cord.

The reason why the twisting pitch of the core is limited to not less than 20 mm is due to the fact that when it is less than 20 mm, it is difficult to penetrate rubber between the steel filaments in the core and the productivity in the twisting lowers. Moreover, when the twisting pitch is infinity, the rubber penetrability can be improved and the productivity can considerably be enhanced. When either or both of the two steel filaments in the core is rendered into wavy or helical form or a combination thereof, the effect aiming at the invention is not damaged. However, when the twisting pitch of the core is more than 50 mm, the fatigue resistance somewhat lowers, so that the twisting pitch is preferably within a range of 20–50 mm.

In the steel cord for the reinforcement of rubber articles, the reason why the diameter of the steel filament constituting the sheath layer is limited to a range of 0.20–0.30 mm is due to the fact that when it is not less than 0.20 mm, if the steel cord is applied to a cross belt layer of the tire, sufficient strength as the tire is obtained and the excellent resistance to burst on severer bad road is developed. When it is not more than 0.30 mm, the fatigue resistance is excellent and the strength per unit sectional area is high and it is possible to reduce the tire weight.

Furthermore, the tensile strength of the steel filament used in the steel cord according to the invention is preferable to be not less than 3140 MPa. According to the invention, the space between the adjoining steel filaments is existent in each of the sheath layers, so that the lack of the cord tenacity is caused. But, if it is intended to maintain the desired cord tenacity by thickening the diameter of the steel filament, the thickness of coating rubber embedding the cords therein undesirably increases to degrade the durability of the rubber article. Therefore, the tensile strength of the steel filament is required to be maintained at a given value instead of the thickening of the filament diameter.

In the production of the steel cord for the reinforcement of rubber articles according to the invention, 6 steel filaments as a middle sheath layer are wound around the core of 2 steel filaments and are helically formed and rendered into flat shape through rolls along the outer periphery of the core. Thus, the steel filaments in the middle sheath layer are arranged without disturbance, so that the space between the adjoining steel filaments in the outer sheath layer is uniformly maintained and hence rubber is easily penetrated into the inside of the cord. That is, it is important that the helical shape of the steel filament in the middle sheath layer is rendered from a circle into a flat shape by disentangling the twisted cord when viewed, from a direction perpendicular to the longitudinal direction of the cord. In this case, it is favorable that a ratio of major axis $C_1$ to minor axis $C_2$ is not more than 0.92.

In the pneumatic radial tire according to the invention, when the above steel cords for the reinforcement of rubber articles are used in a cross belt layer, it is preferable that a distance between the cords is within a range of 0.70–1.10 mm and an interlaminar gauge between belt layers is within a range of 0.75–1.15 mm. When the distance between the cords is limited to a range of 0.70–1.10 mm, the resistance to belt separation becomes optimum. When the interlaminar gauge is limited to a range of 0.75–1.15 mm, the durability in heat generation and the resistance to belt separation become optimum.

The following examples are given in illustration of the invention and are not intended as limitations thereof.

In the cord of Example 1, a wire material of plain carbon steel having a carbon content of 0.82% by weight is used to form a steel filament for the core having a diameter of 0.185 mm and a tensile strength of 3590 MPa and a steel filament for the sheath having a diameter of 0.260 mm and a tensile strength of 3445 MPa. These steel filaments are twisted under conditions shown in table 2 to form steel cords. The other production conditions of the steel cord are shown in Tables 1 and 2.

Figure 6:
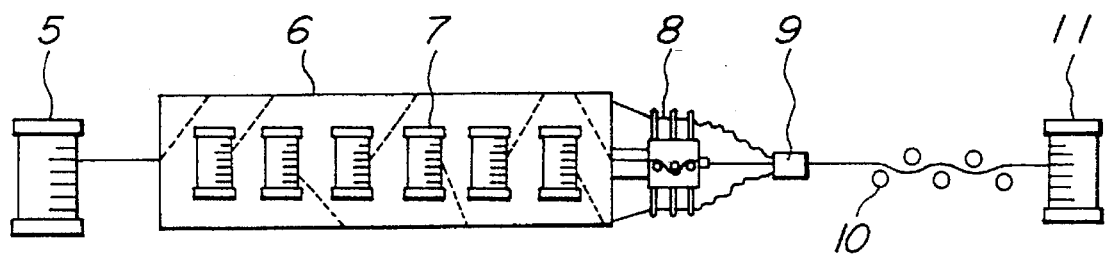
FIG. 6 is a diagrammatic view showing a part of a step for the production of the steel cord for the reinforcement of rubber articles according to the invention.

The concrete twisting method is described with reference to FIG. 6.

A take-up reel 5 winding two twisted steel filaments for the core is arranged at the outside of a tubular twisting machine 6, and six reels 7 each winding a steel filament for the middle sheath layer are disposed in the twisting machine 6 in place. The twisted steel filaments for the core is passed through a twisting die 9, while 6 steel filaments are shaped into a helical form by a forming device 8 without substantially twisting and wound around the core in the twisting die. Then, the helical forms of the 6 steel filaments are made flat along the periphery of the core through a plurality of zigzag arranged rolls 10 and wound around a take-up reel 11. Then, 11 steel filaments for the outer sheath layer each having a diameter of 0.260 mm and a tensile strength of 3415 MPa are wound around the two-layer twisted cord taken out from the reel 11 in a twisting machine (not shown) to obtain steel cords of three-layer twisting structure for Example 1.

Figure 7:
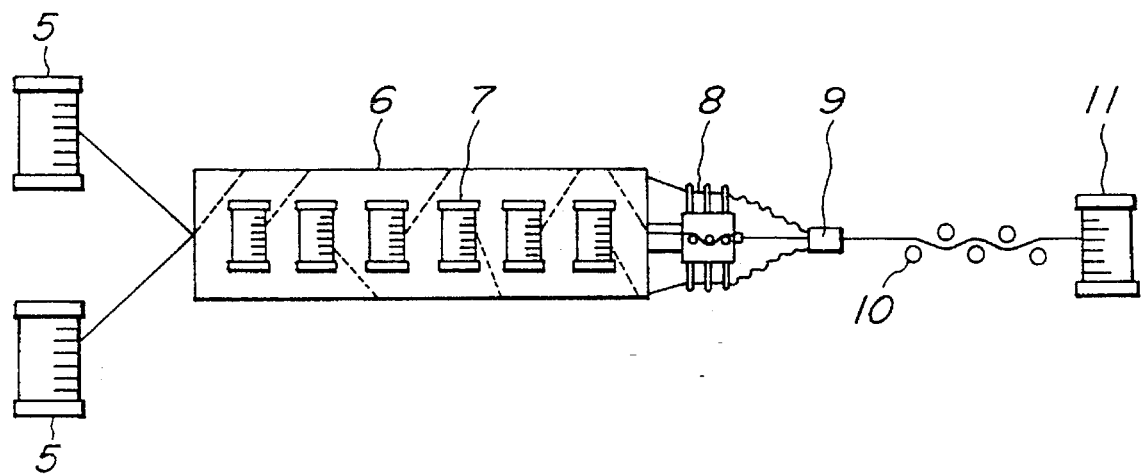
FIG. 7 is a diagrammatic view showing a part of another step for the production of the steel cord for the reinforcement of rubber articles according to the invention.

In the production of the steel cord of Example 3, two take-up reels 5 each winding a single steel filament for the core are disposed outside the tubular twisting machine 6 and passed through the twisting die 9 without twisting as shown in FIG. 7.

Figure 2:
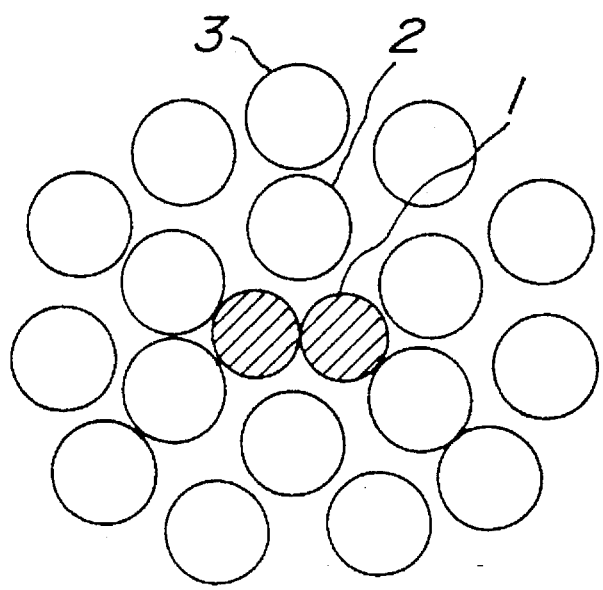
FIG. 2 is a schematically sectional view of a second embodiment of the steel cord for the reinforcement of rubber article according to the invention.

The sections of the steel cords obtained in the examples are shown in FIGS. 1 and 2, while the sections of the steel cords in Conventional Examples 1 and 2 are shown in FIGS. 4 and 5, respectively. In these figures, numeral 1 is a core, numeral 2 a middle sheath layer, numeral 3 an outer sheath layer and numeral 4 a wrapping wire.

Various pneumatic radial tires having a tire size of 10.00 R20 are manufactured by using various steel cords produced as mentioned above in a cross belt layer of the tire and then the following properties are evaluated as follows.

Rubber Penetrability into Inside of Cord

After the steel cord is taken out from the cross belt layer of the test tire, the steel filaments for the outer sheath layer are removed to measure a quantity of rubber adhered onto the middle sheath layer, and then the steel filaments for the middle sheath layer are removed to measure a quantity of rubber adhered onto the core. Each of the rubber quantities is evaluated by percentage on the basis that a state of adhering no rubber to the surface is 0%.

Adhesion Property to Saline Solution

A specimen is prepared by cutting the rubberized steel cord taken out from the cross belt layer of the test tire in a direction perpendicular to the longitudinal direction of the cord to expose an end portion of the cord and then immersed in a 10% saline solution for a given time. Thereafter, lengths of rubber portion adhered from the exposed cut end of the cord to the cord surface, middle sheath surface and core surface are measured to evaluate the adhesion property to saline solution. The adhesion property is represented by an index value on the basis that Conventional Example 1 is 100. The larger the index value, the better the adhesion property to saline solution and hence the better the rubber penetrability.

Resistance to Corrosion Fatique

The cross belt layer is taken out from the test tire and immersed in a 10% saline solution for 1 hour after rubber is removed from the cross belt layer at a given place and is subjected to repetitive bending at a radius of curvature of 120 mm under a given loading at a temperature of 50° C. and a relative humidity of 90% for a given time to measure the number of broken steel filaments. The resistance to corrosion fatigue is represented by an index value on the basis that Conventional Example 1 is 100. The larger the index value, the resistance to corrosion fatigue.

Resistance to Separation Failure

The test tire is mounted on a vehicle and actually run a bad road until the tire is completely worn. Thereafter, the tire is dissected to measure the presence or absence of separation failure resulted from corrosion of the steel cord through propagation of water into the inside of the cord.

The measured results are shown in Tables 1 and 2.

TABLE 1

|  |  | Conventional Example 1 | Conventional Example 2 | Comparative Example 1 | Comparative Example 2 | Comparative Example 3 | Comparative Example 4 | Comparative Example 5 |
| --- | --- | --- | --- | --- | --- | --- | --- | --- |
| Cord structure | | 1×3+9+15+1 | 1×3+8+13 | 1×2+6+11 | 1×2+6+11 | 1×2+5+10 | 1×2+7+12 | 1×2+6+11 |
| Carbon content of wire material (%) | | 0.72 | 0.72 | 0.82 | 0.82 | 0.82 | 0.82 | 0.82 |
| Tensile strength of steel filament | core | 2855 | 2855 | 3445 | 3495 | 3590 | 3590 | 3590 |
| | middle sheath | 2855 | 2855 | 3445 | 3445 | 3445 | 3445 | 3445 |
| | outer | 2855 | 2855 | 3445 | 3445 | 3445 | 3445 | 3445 |

TABLE 1-continued

|  |  | Conventional Example 1 | Conventional Example 2 | Comparative Example 1 | Comparative Example 2 | Comparative Example 3 | Comparative Example 4 | Comparative Example 5 |
|---|---|---|---|---|---|---|---|---|
| (MPa) | sheath |  |  |  |  |  |  |  |
| Diameter of steel filament (mm) | core | 0.230 | 0.230 | 0.260 | 0.160 | 0.185 | 0.185 | 0.185 |
|  | middle sheath | 0.230 | 0.230 | 0.260 | 0.260 | 0.260 | 0.260 | 0.260 |
|  | outer sheath | 0.230 | 0.230 | 0.260 | 0.260 | 0.260 | 0.260 | 0.260 |
|  | diameter ratio (ds/dc) | 1.000 | 1.000 | 1.000 | 1.625 | 1.405 | 1.405 | 1.405 |
| Twisting pitch (mm) | core | 6 | 6 | 30 | 30 | 30 | 30 | 6 |
|  | middle sheath | 12 | 12 | 11 | 11 | 11 | 11 | 12 |
|  | outer sheath | 18 | 18 | 22 | 18 | 18 | 18 | 18 |
| Twisting direction |  | S/S/Z/S | S/S/Z | S/S/S | S/S/Z | S/S/Z | S/S/Z | S/S/Z |
| Cord tenacity (N) |  | 2980 | 2650 | 3225 | 3025 | 2710 | 3415 | 3040 |
| $C_1/C_2$ |  | 0.99 | 0.99 | 0.97 | 0.97 | 0.97 | 0.97 | 0.97 |
| Rubber penetrability (%) | on the core | 0 | 53 | 46 | 7 | 40 | 2 | 50 |
|  | on the middle sheath | 4 | 85 | 78 | 13 | 70 | 10 | 82 |
| Adhesion property against saline solution |  | 100 | 150 | 370 | 280 | 330 | 200 | 380 |
| Resistance to corrosion fatigue |  | 100 | 133 | 130 | 126 | 128 | 110 | 132 |
| Presence or absence of separation failure |  | presence | presence | presence | presence | presence | presence | presence |

TABLE 2

|  |  | Example 1 | Example 2 | Example 3 | Example 4 | Example 5 | Example 6 | Example 7 |
|---|---|---|---|---|---|---|---|---|
| Cord structure |  | 1×2+6+11 | 1×2+6+11+1 | 2+6+11+1 | 1×2+6+11 | 1×2+6+11 | 1×2+6+11 | 1×2+6+11 |
| Carbon content of wire material (%) |  | 0.82 | 0.82 | 0.82 | 0.82 | 0.82 | 0.82 | 0.72 |
| Tensile strength of steel (MPa) | core | 3590 | 3590 | 3590 | 3590 | 3550 | 3580 | 2990 |
|  | middle sheath | 3445 | 3445 | 3445 | 3445 | 3500 | 3445 | 2845 |
|  | outer sheath | 3445 | 3445 | 3445 | 3445 | 3500 | 3445 | 2845 |
| Diameter of steel filament (mm) | core | 0.185 | 0.185 | 0.185 | 0.185 | 0.175 | 0.220 | 0.185 |
|  | middle sheath | 0.260 | 0.260 | 0.260 | 0.260 | 0.245 | 0.260 | 0.260 |
|  | outer sheath | 0.260 | 0.260 | 0.260 | 0.260 | 0.245 | 0.260 | 0.260 |
|  | diameter ratio (ds/dc) | 1.405 | 1.405 | 1.405 | 1.405 | 1.400 | 1.182 | 1.405 |
| Twisting pitch (mm) | core | 30 | 30 | ∞ | 50 | 30 | 30 | 30 |
|  | middle sheath | 11 | 11 | 11 | 11 | 11 | 11 | 11 |
|  | outer sheath | 18 | 18 | 18 | 18 | 18 | 18 | 18 |
| Twisting direction |  | S/S/Z | S/S/Z/S | S/S/Z/S | S/S/Z | S/S/Z | S/S/Z | S/S/Z |
| Cord tenacity (N) |  | 3080 | 3075 | 3105 | 3100 | 2770 | 3145 | 2540 |
| $C_1/C_2$ |  | 0.88 | 0.88 | 0.85 | 0.87 | 0.88 | 0.86 | 0.88 |
| Rubber penetrability (%) | on the core | 79 | 77 | 80 | 80 | 79 | 77 | 77 |
|  | on the middle sheath | 99 | 98 | 98 | 100 | 96 | 97 | 99 |
| Adhesion property against saline solution |  | 805 | 790 | 820 | 825 | 800 | 780 | 805 |
| Resistance to corrosion fatigue |  | 153 | 145 | 135 | 151 | 155 | 146 | 160 |
| Presence or absence of separation failure |  | absence | absence | absence | absence | absence | absence | absence* |

*Resistance to separation at belt edge is poor

As mentioned above, according to the invention, there can be provided steel cords for the reinforcement of rubber articles which largely improve the corrosion resistance and productivity and are excellent in the flexibility without damaging a large cord breaking load and good fatigue resistance inherent to the multi-layer twisting structure cord. Furthermore, when such steel cords are applied to the cross belt layer of the pneumatic radial tire, the rubber penetrability into the inside of the cord is excellent, so that excellent durability a retreading property can be developed.

What is claimed is:

1. A steel cord for the reinforcement of rubber articles having a three-layer twisting structure and comprising; a core of 2 steel filaments, a middle sheath layer of 6 steel filaments wound around the core and an outer sheath layer of 11 steel filaments wound around the middle sheath layer, a ratio of diameter (ds) of a steel filament constituting the middle and outer sheath layers to diameter (dc) of a steel filament constituting the core (ds/dc) is within a range of 1.15–1.5 and a twisting pitch of the core is infinity and the steel filaments in the core are aligned in parallel with each other.

2. The steel cord according to claim 1, wherein the twisting pitch of the core is within a range of 20–50 mm.

3. The steel cord according to claim 1, wherein the diameter of the steel filament in the sheath layers is within a range of 0.20–0.30 mm.

4. The steel cord according to claim 1, wherein the steel filament used in the core and sheath layers is obtained by drawing a steel wire having a carbon content of 0.80–0.85% by weight and has a tensile strength of not less than 3140 MPa.

5. The steel cord according to claim 1, wherein a wrapping wire is wound around the outer sheath layer.

6. A method of producing steel cords for the reinforcement of rubber articles comprising the steps of:

using 2 steel filaments as a core, winding 6 steel filaments as a middle sheath around the core, rendering a helical formed shape of the 6 steel filaments as the middle sheath into a flat shape along the outer periphery of the core of two steel filaments through rolls, and then winding 11 steel filaments as an outer sheath around the middle sheath, to produce a three-layer twisting structure having a core of 2 steel filaments, a middle sheath layer of 6 steel filaments wound around the core and an outer sheath layer of 11 steel filaments wound around the middle sheath layer, where a ratio of diameter (ds) of a steel filament constituting the middle and outer sheath layers to diameter (dc) of a steel filament constituting the core (ds/dc) is within a range of 1.15–1.5 and a twisting pitch of the core is infinity and the steel filaments in the core are aligned in parallel with each other.

* * * * *